C. D. REEVES.
DIRIGIBLE HEADLIGHT.
APPLICATION FILED JULY 23, 1919.

1,410,508.

Patented Mar. 21, 1922.
2 SHEETS—SHEET 1.

Inventor
C. D. Reeves
By Lancaster and Allwine
his Attorneys

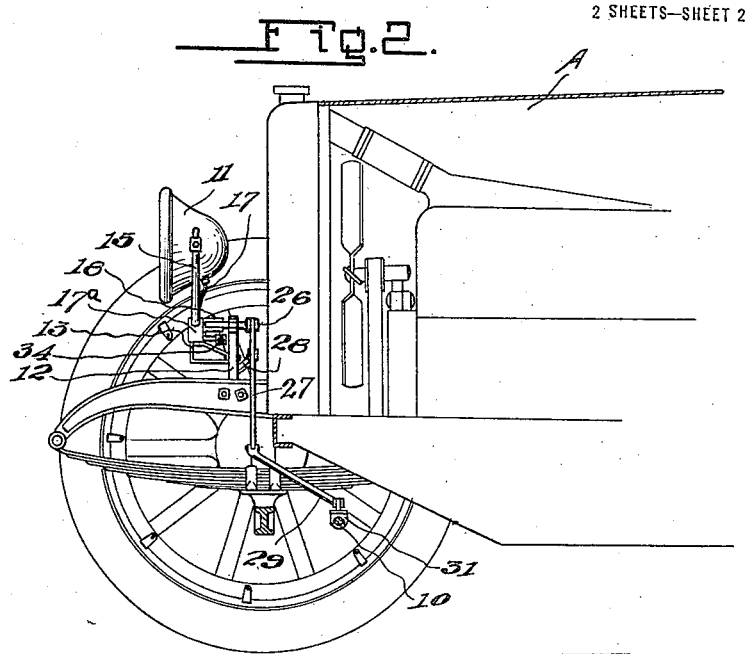
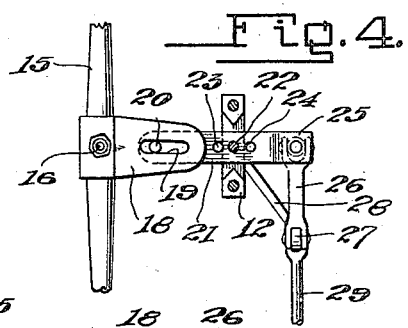
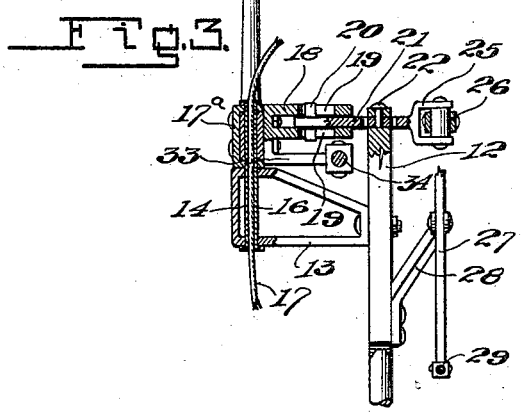
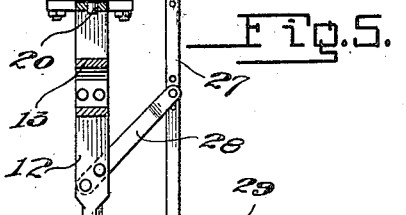

UNITED STATES PATENT OFFICE.

CLINTON D. REEVES, OF TACOMA, WASHINGTON.

DIRIGIBLE HEADLIGHT.

1,410,508.   Specification of Letters Patent.   Patented Mar. 21, 1922.

Application filed July 23, 1919. Serial No. 312,760.

*To all whom it may concern:*

Be it known that I, CLINTON D. REEVES, a citizen of the United States, residing at Tacoma, in the county of Pierce and State of Washington, have invented certain new and useful Improvements in Dirigible Headlights, of which the following is a specification.

This invention relates to dirigible headlights or lamps as used upon motor vehicles, and an object of the invention is to provide means which may be attached to any approved type of motor vehicle for supporting the headlight or lamp thereof to permit them to be simultaneously moved, with each other and in unison with the steering wheel of the vehicle, so that the path of the vehicle will be sufficiently illuminated, thereby preventing collision or accident when making a sharp turn, and to provide means for operating the lamp which is connected to the steering cross rod, for movement therewith, whereby the shaft of light will be immediately varied with each adjustment of the front steering wheel to deviate the vehicle from a straight path.

Other objects of the invention will appear in the following detailed description taken in connection with the accompanying drawings, forming a part of this specification, and in which drawings:

Figure 2 is a fragmentary view of the forward end of an automobile showing the improved dirigible headlight applied thereto.

Figure 3 is a detail view partly in section and partly in side elevation of one of the supports for one of the headlights.

Figure 4 is a fragmentary top plan of the mechanism illustrated in Figure 3.

Figure 5 is a fragmentary top plan, partly in section of the headlight operating mechanism.

Figure 1:
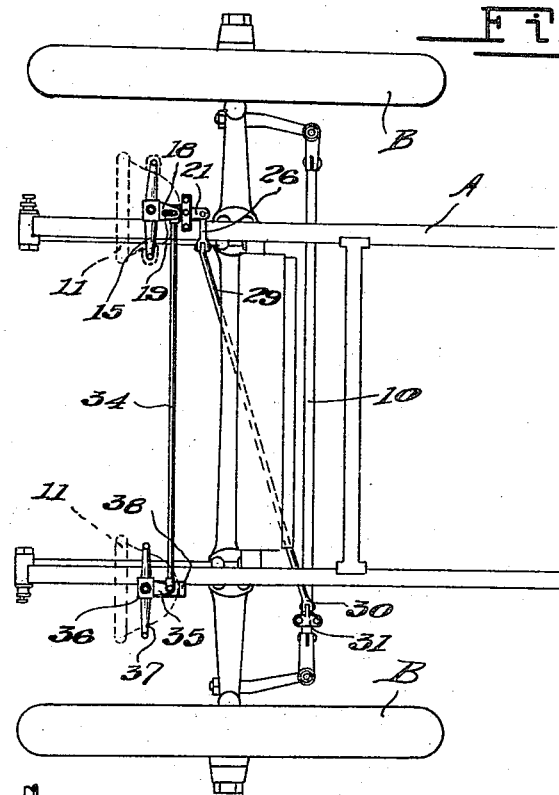
Figure 1 is a top plan of a fragment of the chassis of a motor vehicle showing the improved head light operating means connected thereto.
Figure 6:
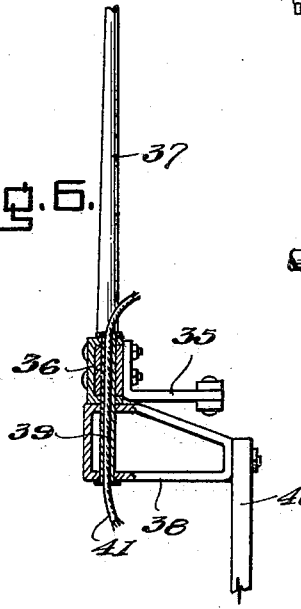
Figure 6 is a detail partly in side elevation and partly in section of the lamp support other than that disclosed in Figure 3.
Figure 7:
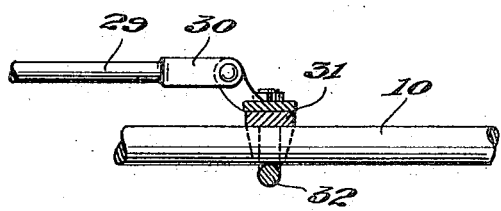
Figure 7 is a detail view partly in section illustrating the manner of connecting the headlight to the cross rod of the steering mechanism of the vehicle.

Referring more particularly to the drawings, wherein like characters indicate like and corresponding parts throughout the several views, A indicates a motor vehicle of any approved type including the front steering wheels B which are steered by any approved type of steering mechanism including the usual cross rod 10. The headlights or lamps 11 ordinarily used on the motor vehicle may be employed in connection with the dirigible mechanism for supporting and operating them and this mechanism including a standard 12 which is attached to the chassis of the vehicle A in lieu of one of the usual lamp supporting standards.

The standard 12 has a substantially triangularly shaped supported bracket 13 attached to the forward side thereof near its upper end, and this bracket rotatably supports the stem 14 of the lamp carrying support 15. The stem 14 is provided with the usual axial way 16 to permit the passage of the cord or electric conducting wire 17 therethrough, which supplies the necessary current to the lamp structure 11. The support 15 has a member 17ª connected to the stem and arm thereof, to which member a substantially U-shaped bracket 18 is attached. The horizontal portions or plates of the bracket 18 are provided with aligning slots 19, in which the upper and lower ends of a pin 20 engage. The pin 20 is carried by the forward end of an arm 21. The arm 21 is pivotally connected by means of a suitable pin 22 to the upper end of the standard 12, and this arm 21 is provided with a plurality of openings 23 and 24 by means of which adjustment of the connection of the arm with the standard 12 may be had to accommodate different shapes of lamps and cars.

The outer end of the arm or lever 21 is preferably forked as shown at 25, and a forked arm 26 is pivotally connected thereto. A vertically extending lever 27 is pivotally connected to the outer forked end of the arm 26 and it is pivotally supported intermediate its ends by a bracket 28 which is in turn supported by the standard 12. A rod 29 is connected to the lower end of the lever 27 and has its end remote from this lever forked, as shown at 30. A coupling member 31 is pivotally connected to the forked end 30 of the rod 29 and carries a U-shaped bolt 32 which is adapted to engage about the cross rod 10 of the steering mechanism of the vehicle A. The coupling member 31 is shaped to snugly fit about the cross rod 10 to securely connect the operating rod 29 to this cross rod.

The member 17ᵃ has an arm 33 connected thereto to which arm a cross rod 34 is pivotally connected. The cross rod 34 extends across the front of the vehicle from the supporting bracket structure carried by the standard 12 to the opposite side of the vehicle where it is connected to an arm 35. The arm 35 is carried by the member 36 which is attached to the stem of the lamp supporting fork 37. The member 36 rests upon the upper horizontal portion of a substantially triangularly shaped bracket 38 which rotatably receives the stem 39 of the fork 37 and is attached to the standards 40 corresponding to the standard 12 and positioned at the opposite side of the vehicle. The stem 39 of the member 36 is provided with a way to receive therethrough the electric conducting cord 41 for permitting of the connection of the lamp 11 carried by the fork 37 with the usual current supply source for the lamp.

In operation, as a vehicle driver operates the steering mechanism in such manner that the steering rod 10 is moved to the right for turning the vehicle wheels to the left, the rod 29 which pivotally engages the lever 27, will operate said lever 27 to operate the same transversely of the motor vehicle. The lever 21 pivotally connected upon the standard 12 is then rocked, by means of the link connection 26, in such manner that the forked end 25 of said lever 21 moves to the left of the motor vehicle. This throws the slotted end of the arm 18 to the right and rocks the lamp 11 upon its support 15 to the left and which is the direction in which the vehicle is about to turn. Due to the rod 34 connecting with the bracket 35 of the headlight mounting fork 37, the same will be rocked in the same relation and synchronous with the movement of the lamp on fork 15, by means of the mechanism heretobefore described.

Changes in details may be made without departing from the spirit of this invention, but;

I claim:

1. A dirigible headlight, comprising in combination a standard, a bracket mounted on said standard, a lamp support pivotally carried by said bracket, a rearwardly extending arm having a slot therein carried by said lamp support, a lever pivotally carried by said standard, and having a projection thereon engaging through the slot of said rearwardly extending arm, a second lever pivotally carried by said bracket, and means pivotally connecting said levers for oscillation of said first mentioned lever to oscillate the lamp support upon rocking of said second lever.

2. In a dirigible headlight, the combination with a motor vehicle having a steering mechanism thereon including a cross rod, of a standard mounted on said motor vehicle, a bracket extending forwardly therefrom, a lamp support pivotally carried by said forwardly extending bracket, an arm having a longitudinal slot therein mounted on the support, a lever extending longitudinally of the motor vehicle and pivotally mounted on said standard, and having a pin thereon engaging the slot of said arm, a link carried by said lever, a second lever pivotally carried by said standard and engaging said link, and a connecting rod pivotally carried by said second mentioned lever and engaging said cross rod for oscillation of said lamp support upon operation of the steering mechanism.

3. A dirigible headlight comprising a base plate, a supporting standard, a lamp structure pivotally mounted on said supporting standard, a lever pivotally mounted upon said standard and engaging said lamp structure for oscillating said lamp, a second lever pivotally mounted on said standard, a link pivotally connecting the first and second mentioned levers, and means connecting said second mentioned lever and said steering mechanism for rocking said lamp structure upon movement of said steering mechanism.

CLINTON D. REEVES.